UNITED STATES PATENT OFFICE.

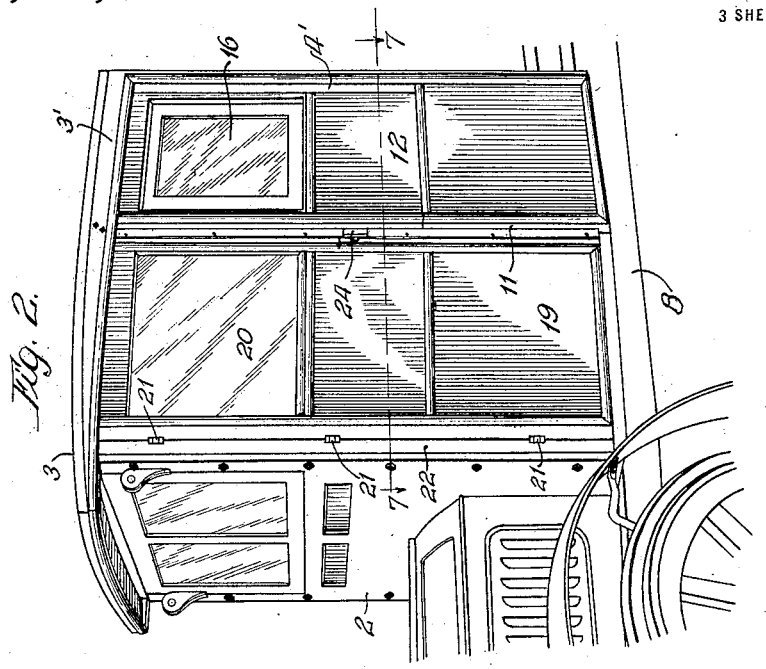
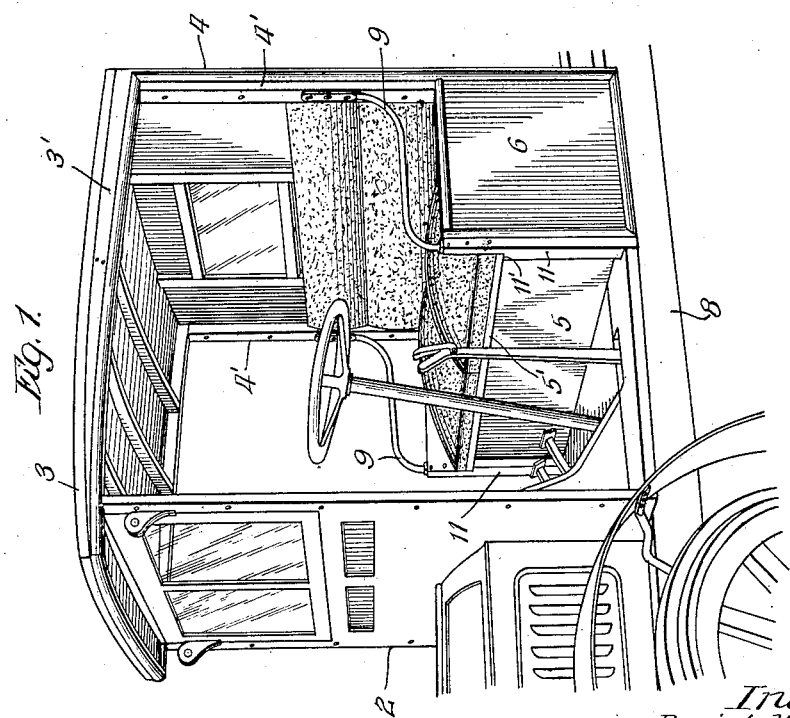

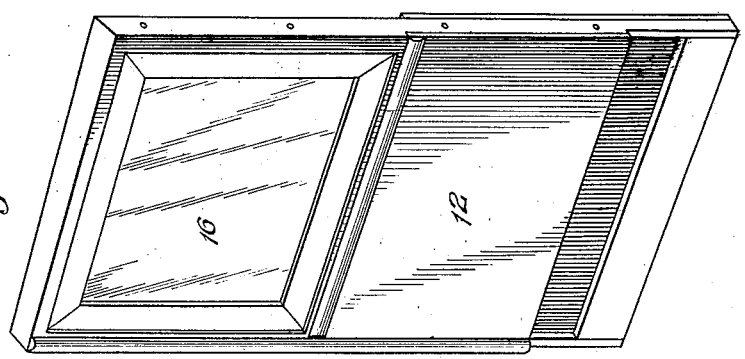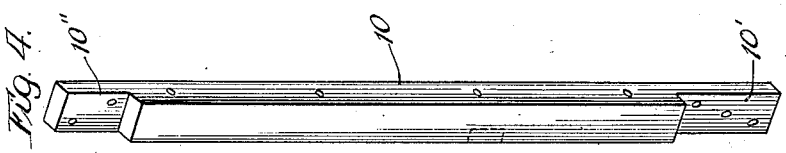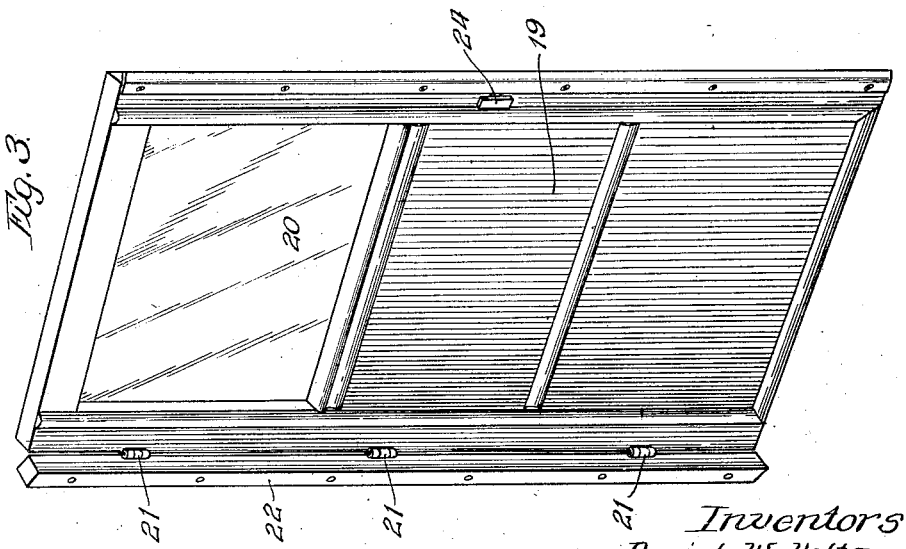

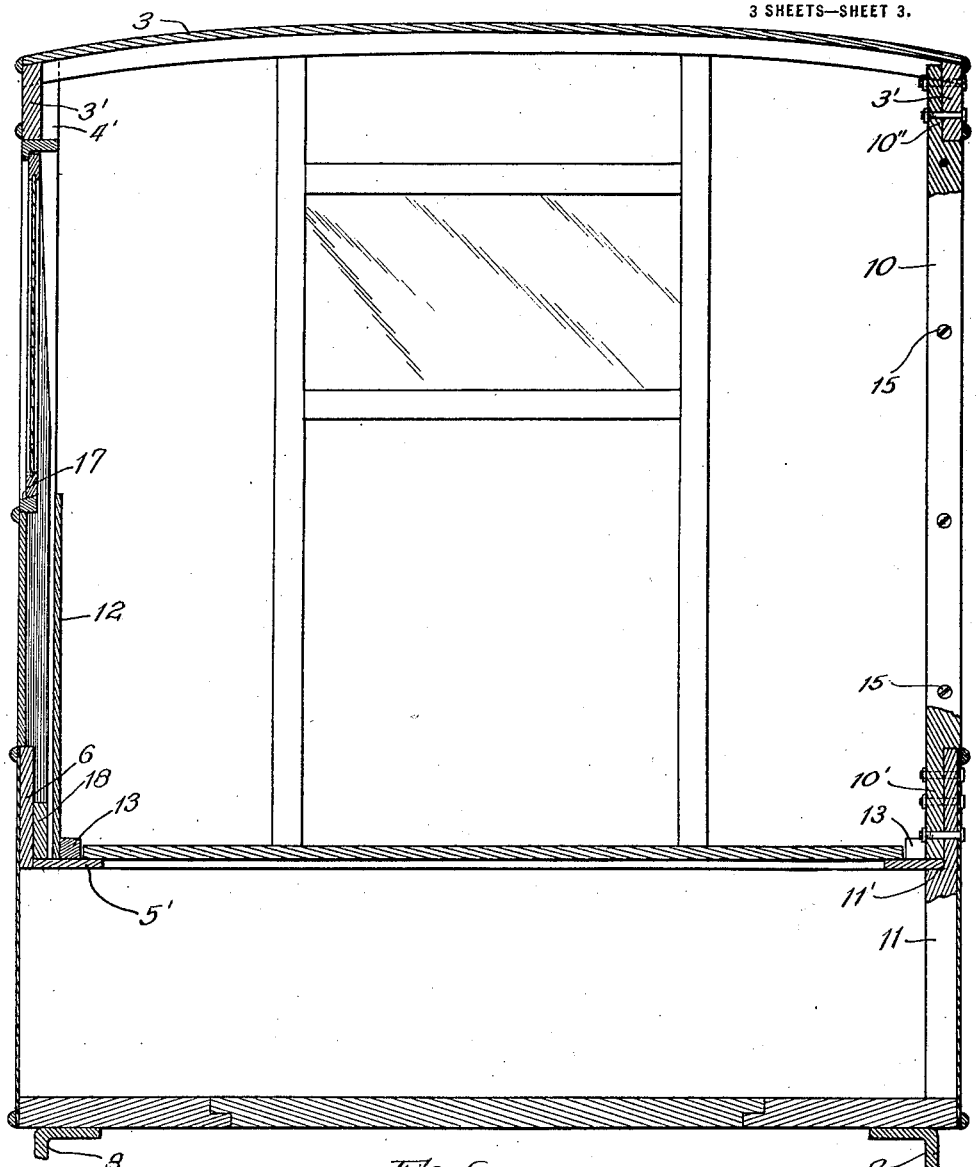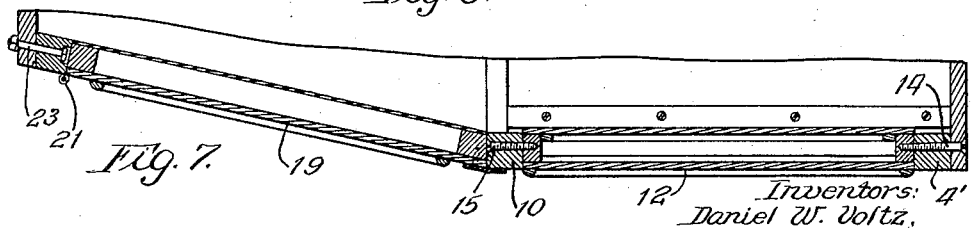

DANIEL W. VOLTZ, EDWARD C. VOLTZ, AND GEORGE E. HAMMEL, OF CHICAGO, ILLINOIS, ASSIGNORS TO VOLTZ BROTHERS, OF CHICAGO, ILLINOIS, A CORPORATION OF ILLINOIS.

AUTOTRUCK CAB.

1,427,660.        Specification of Letters Patent.     Patented Aug. 29, 1922.

Application filed June 16, 1921. Serial No. 477,890.

*To all whom it may concern:*

Be it known that we, DANIEL W. VOLTZ, EDWARD C. VOLTZ, and GEORGE E. HAMMEL, citizens of the United States, residing at Chicago, in the county of Cook and State of Illinois, have invented certain new and useful Improvements in Autotruck Cabs, of which the following is a specification.

The object of this invention is to provide a cab for auto trucks and the like which can easily be made open or closed to conform with the seasons of the year or to render the cab more comfortable according to the changes in the weather.

And a further object of the invention is to enable the conversion of an open cab into a closed cab by the addition of only a few unit parts which can be easily and quickly installed and tightly and rigidly secured in place.

In the accompanying drawings illustrating a selected embodiment of the invention Fig. 1 is a perspective view of the cab open.

Fig. 2 is a similar view of the cab closed.

Fig. 3 is a perspective view of a door unit.

Fig. 4 is a perspective view of an extension post.

Fig. 5 is a perspective view of a side window unit.

Fig. 6 is a transverse sectional view taken through the window unit on one side of the cab and just back of the post on the other side of the cab.

Fig. 7 is an enlarged detail horizontal sectional view on the line 7—7 of Fig. 2.

Referring to the drawings 8 designates the frame of a truck or other vehicle upon which is permanently installed the front 2, the top 3, the back 4, the seat 5 and the sides 6 of the cab. To convert the open cab as shown in Fig. 1 to the closed cab as shown in Fig. 2 we preferably remove the hand rails 9 and install extension posts 10 on the seat posts 11 as shown in Fig. 6. The seat posts are recessed at their upper ends as shown in Fig. 1 to form shoulder supports 11' for the top 5' of the seat and the lower end of the extension post is recessed at 10' to form a lap joint with the upper end of the seat post as shown in Fig. 6. The upper end of the extension post is recessed at 10'' to engage the side piece 3' of the top 3 of the cab. The extension post is bolted to the seat post and to the top side piece and is thereby rigidly secured in place.

The side window unit comprises a sash 12, Fig. 5, which is adapted to rest upon the top 5' of the seat and to engage the lower edge of the top side piece 3' and to fit snugly between the rear corner post 4' of the cab and the adjacent extension post 10. This unit is secured in place between the cab side 6 and a strip 13 fastened to the top 5' of the seat and it is also secured by screws 14 to the post 4' and by screws 15 to the post 10.

A window 16 is movably arranged in the sash 11 and is supported in closed position upon the sill 17 and in lowered open position on the filler block 18. We have shown a very simple construction and arrangement of this side window unit which has been found very satisfactory in actual commercial use but other more elaborate sash constructions may be employed if desired to meet different requirements.

The door unit comprises a door 19 having a window 20 and secured by hinges 21 to a door post 22. We prefer to provide the door and door post as a single unit and secure the post to the front of the cab by bolts 23 as required, but, the post may be permanently secured to the front of the cab and suitable hinges provided so that the door may be readily disconnected from the post or engaged therewith as required. We prefer that the door post should be detachable with the door to provide wider door space for the cab and because it is as easy to detach the post from the front of the cab as it would be to detach the door from the post. The door unit is designed to completely close the opening between the front of the cab and the side and the side window unit and a suitable handle lock device 24 is provided to hold the door in closed position.

The invention provides a strong, tight, substantially closed cab which can be easily and quickly converted into an open cab by removal of the door units, the extension post units and the side window units, and as easily reconverted into a closed cab by replacing these units. The units themselves are of a strong and substantial construction and when fitted into place in the cab they make a tight enclosure which will protect the occupants of the cab in inclement weather.

We are aware that changes in the form, proportion and construction of the various parts may be required to adapt the invention to cabs of different sizes, shapes and makes and for other purpose and we reserve the right to make all such changes as fall within the scope of the following claims.

We claim:

1. A truck cab comprising a seat, a post projecting above the seat and having a shoulder to support the seat, an extension post fastened to the upward projecting portion of the seat post and to the top of the cab, and a side window unit mounted upon the seat and detachably engaged with the back of the cab and with said extension post.

2. A truck cab comprising a seat, a strip on the seat adjacent the side of the cab, a post projecting above the seat and having a shoulder to support the seat, an extension post fastened to the upward projecting portion of the seat post and to the top of the cab, and a side window unit mounted upon the seat between the strip and the side of the cab and detachably engaged with the back of the cab and with said extension post.

3. A truck cab comprising a seat, a strip on the seat adjacent the side of the cab, a post projecting above the seat and having a shoulder to support the seat, an extension post having lap joint connections with the upward projecting portion of the seat post and with the top of the cab, and a side window unit mounted upon the seat between the strip and the side of the cab and detachably engaged with the back of the cab and with said extension post.

4. A truck cab comprising a permanent front, a door post detachably secured to said front, a seat post, an extension post detachably secured to the seat post and to the top of the cab, a door hinged to the door post on the front of the cab, and interlocking means on the door and said extension post.

DANIEL W. VOLTZ,
EDWARD C. VOLTZ,
GEORGE E. HAMMEL.